United States Patent
Williams

[15] 3,666,185
[45] May 30, 1972

[54] CRYOGENIC CRUSHING OF MATERIALS

[72] Inventor: Virgil C. Williams, 103 Frontenac Forest, St. Louis, Mo. 63131

[22] Filed: Feb. 17, 1971

[21] Appl. No.: 115,976

[52] U.S. Cl. ............................................241/17, 241/23
[51] Int. Cl. .....................................................B02c 21/00
[58] Field of Search.........................241/15, 17, 23, 48, 68

[56] References Cited

UNITED STATES PATENTS

| | | | |
|---|---|---|---|
| 2,609,150 | 9/1952 | Bludeau | 241/15 |
| 2,964,184 | 12/1960 | Gillette | 241/68 X |
| 3,527,414 | 9/1970 | Schorsch | 241/23 |
| 2,363,282 | 11/1944 | Arnold | 241/48 X |
| 2,735,624 | 2/1956 | Beck | 241/17 |
| 2,836,368 | 5/1958 | McCoy | 241/17 |

*Primary Examiner*—Granville Y. Custer, Jr.
*Attorney*—Rogers, Ezell, Eilers & Robbins

[57] ABSTRACT

A cryogenic process for disintegrating materials such as metals, plastics, rubber, foodstuffs; wastes such as scrap iron, garbage, etc. The process is employed for materials which have decreased impact resistance upon refrigeration to low temperatures and recovers the refrigeration from the material after disintegration and employs this refrigeration in cooling of the material. The process can be employed in a continuous form where ferrous scrap material, such as junk automobiles, or the like, are fed countercurrently with a refrigerant fluid such as air or nitrogen in a pre-cooling stage and subsequently to a cryogenic cooling stage where the material is cooled to very low temperatures, and subsequently broken in a process using hammers, mechanical shredders, rotary crushers, or other physical forms. In the continuous process, in the post-cooling stage after breaking, the disintegrated material is passed in countercurrent heat exchange relation with the refrigerant fluid to recover the cold in the material. The scrap material in this stage may be separated by a magnetic separator which separates ferrous material from copper, aluminum and other materials, such as organic scrap in the form of fibers or the like, or separation may be effected on screens or in air or hydraulic elutriators or in cyclone separators. The refrigerant fluid may be used in a closed system, passing from the post-cooling stage to the cryogenic cooling stage where additional cryogenic refrigerant fluid may be added and into the pre-cooling stage and back to the process. In a preferred embodiment the refrigerant fluid, after passing through the pre-cooling stage, may be in part compressed to a high pressure and then expanded to a very low temperature in a turbine expander where the cooled refrigerant is used directly in the cryogenic cooling stage. The remainder of the refrigerant fluid, after the pre-cooling stage, that is not passed through the high pressure stage, may be recycled back to the post-cooling stage, where it is used to abstract refrigeration from the cold, disintegrated material.

4 Claims, 8 Drawing Figures

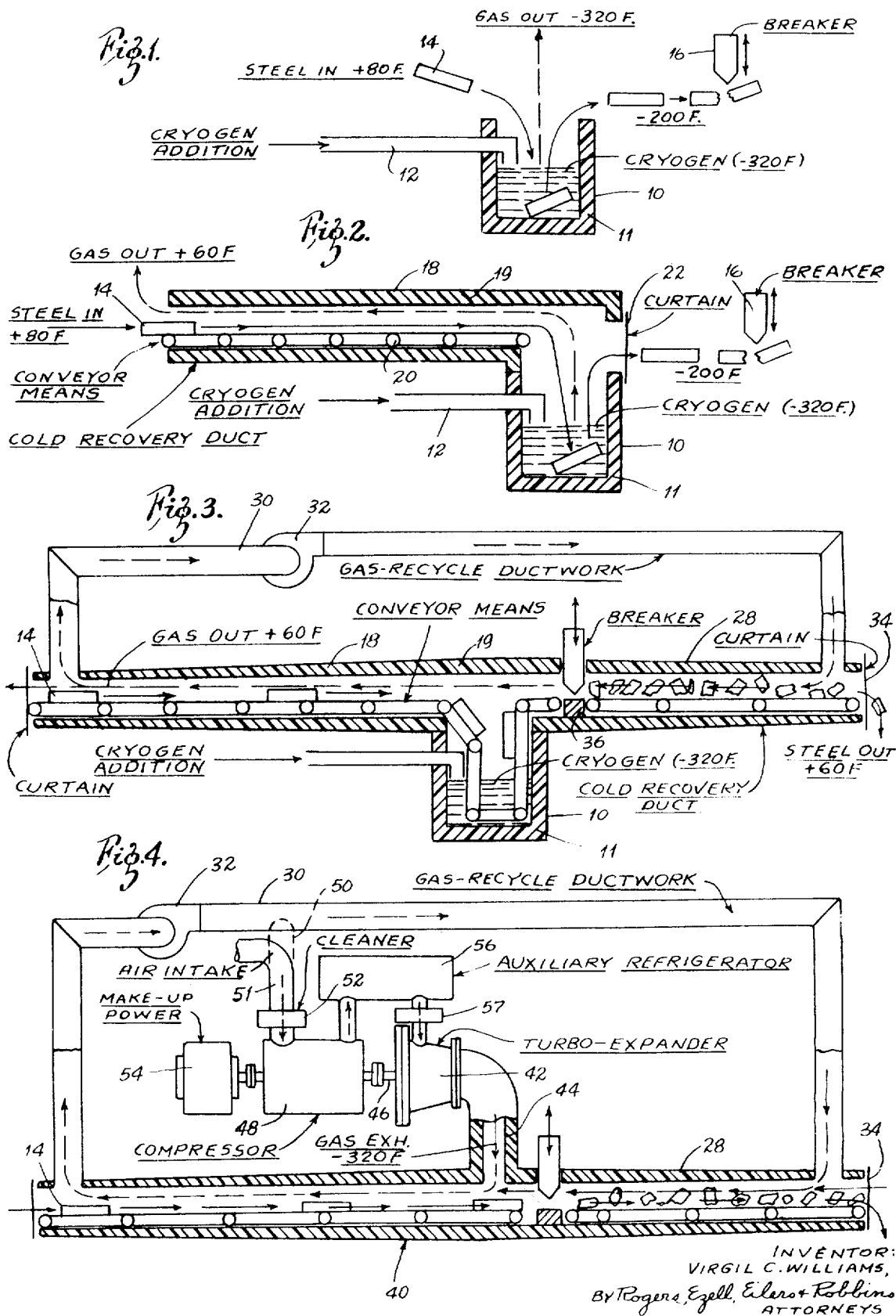

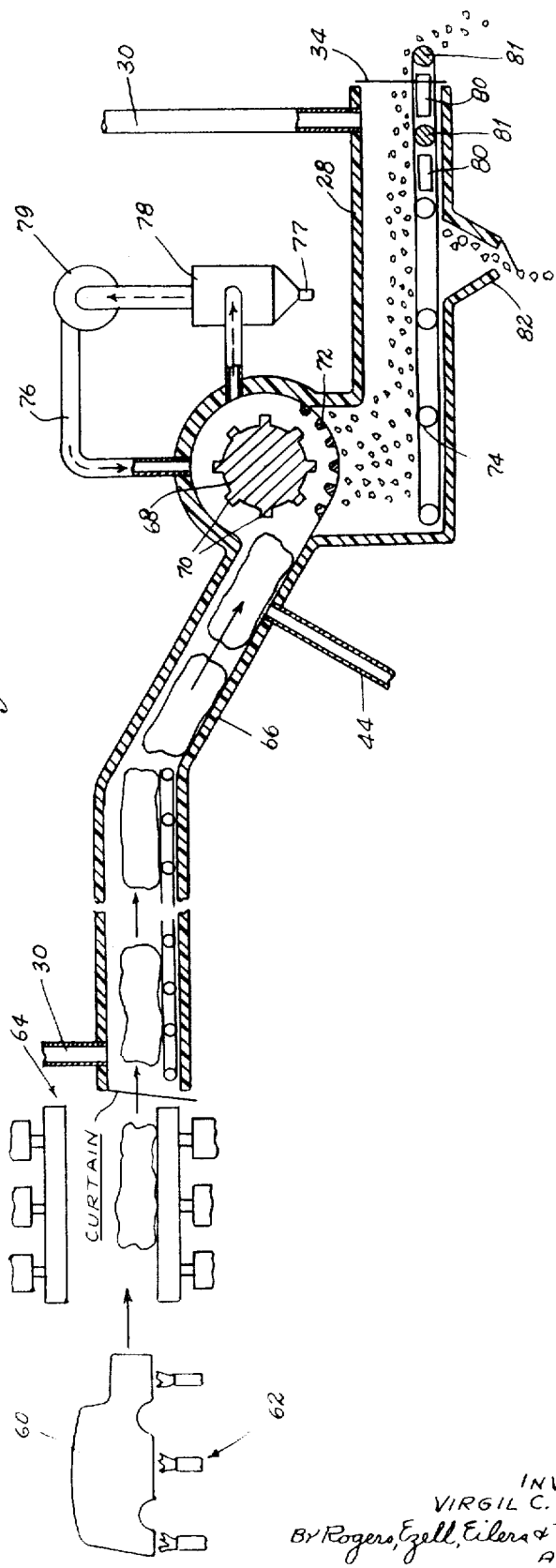

IMPACT ENERGY OF AISI-SAE PLAIN CARBON STEELS

TYPICAL V-NOTCH CHARPY TRANSITION CURVES AND NDT TEMPERATURES FOR NORMALIZED 2¼% NICKEL STEEL PLATE

CRYOGENIC CRUSHING OF MATERIALS

BACKGROUND OF THE INVENTION

The problem of scrap processing has been increasing many fold in recent years due to increasing population and production. The problem is especially acute in the ever growing numbers of junk and derelict automobiles. Although junk automobiles have scrap value, their value depends upon the price of scrap steel, which fluctuates and, due to the cost of transportation and processing, their disposal is quite difficult. Transportation of the derelict automobiles must be provided to a processing center, which are few in number and scattered throughout the country. Such processing center will compact an automobile by huge and expensive presses and then mechanically disintegrate the automobile by mechanically shredding or impacting the automobile. The entire process, transportation, compacting, certain parts removal in the processing, is quite expensive and has occasioned the accumulation of derelict automobiles on the streets and in unsightly junk yards. Further, there is a pollution problem, not only visual but audio, as well as olfactory due to burning of the combustible parts of the automobile and the dust and debris and noise created in the mechanical disintegration.

A further problem has existed in handling scrap metal parts which may be occasioned in the stamping of various metallic stampings. The scrap stamp material, such as in flat steel or sheet metal, or the like, is generally collected and shipped back to the steel plant which occasions the cost of collecting, storage of the bulky scrap material and transportation.

Various efforts have been made in the past to process scrap material that can be disintegrated or otherwise broken apart at cryogenic temperatures into small fragments or shards, where the impact strength of materials such as various metals, organic plastics and the like, decreases remarkably on exposure to cryogenic temperatures in the region of −50° F and below. Such processes have provided promise due to the availability for disintegration and packing of the scrap disintegrated material in easily handled facilities and shipment to further processing centers where the scrap material can be utilized, such as a steel mill for scrap steel and the like. However, the extremely high cost of providing refrigeration to cryogenic temperatures has provided a problem in the economical success of such processes, when in competition with existing scrap processing problems which may be more economical but with pollution and handling disadvantages. By means of this invention, there has been provided an economic and efficient cryogenic process for handling scrap materials.

SUMMARY OF THE INVENTION

By means of this invention, there has been provided an economical, cryogenic process for disintegration of materials for ease in subsequent handling, compaction and shipment. The process essentially contemplates charging the material to a cryogenic zone where the material, such as scrap metal, is cooled to extremely low temperatures and where the impact resistance is reduced to a minimal amount. The cold material is then mechanically disintegrated and passed in heat exchange relation with a refrigerant fluid such as air or nitrogen. The refrigerant fluid is then used with any vaporized or exhaust gas or fluid from the cryogenic zone to precool the scrap material before it is charged to the cryogenic zone to fully utilize and reclaim the refrigeration in the disintegrated scrap material. Further, by means of this process, a cyclic refrigeration cycle can be employed where the refrigerant fluid such as nitrogen or air is passed in countercurrent heat relation with the disintegrated material past the cryogenic zone and a precooling stage and recycled with the provision of air cleaners or fluid cleaners, where necessary, to be re-introduced in heat exchange relation with the frozen, disintegrated material for full recovery of the refrigeration therein. The process lends itself extremely well to such a continuous process where the scrap material is cryogenically cooled by a refrigerant fluid such as air or nitrogen exhausted from a turbo-expander at the order of −50° to −320° F. This refrigerant fluid can be withdrawn from the main refrigerant stream after it has been exhausted from the precooling stage, where it may be cleaned and then compressed to the necessary pressure, aftercooled, and then exhausted through a turbo-expander to the appropriate low cryogenic temperature necessary for low impact resistance material and thus easy frangibility. Auxiliary refrigeration may be employed also as a part of the aftercooling, such as by water or conventional freon refrigerants, and it will be understood that the work from the turbo-expander may be used in part for the make-up power in the compressor stage. The process may also be employed where a liquid bath is employed in the cryogenic freezing stage, such as by operating the turbo-expander with partial liquid exhaust or by the addition of liquid nitrogen or liquid air to a bath or tank where the scrap material is immersed. Vaporized refrigerant from the bath is combined with the refrigerant fluid passed in heat exchange relation with the disintegrated frozen material and used in the precooling stage and then recycled, as above described.

The foregoing features are objects of this invention. Further objects will appear in the detailed description which follows and will be otherwise apparent to those skilled in the art.

For the purpose of illustration of this invention, there is shown in the accompanying drawings typical embodiments of this invention. It is to be understood that these drawings are for purpose of illustration only and that the invention is not limited thereto.

In the drawings:

FIG. 1 is a schematic drawing showing the cryogenic freezing of scrap material and disintegration by a breaker;

FIG. 2 is a schematic drawing showing the addition to FIG. 1 of a conveyor and the recovery of effluent or waste cryogenic gas to pre-cool the scrap material;

FIG. 3 illustrates an embodiment of this invention using a cyclic process or cryogenic cooling of scrap material in which the refrigeration from the disintegrated scrap material is recovered and used in the pre-cooling stage;

FIG. 4 is a modification of FIG. 3 where the cryogenic fluid used is a gas or saturated gas in a cyclic system and refrigeration of the cryogenic gas is accomplished at least in part by compression of the refrigerant and expansion in a turbo-expander;

FIG. 5 is a schematic diagram of a modification of the process of FIG. 4 used in disintegrating junked automobiles;

FIG. 7a is a curve showing typical low temperature breaking strength of various types of plain carbon steels; while

DESCRIPTION OF THE INVENTION

Figure 6:
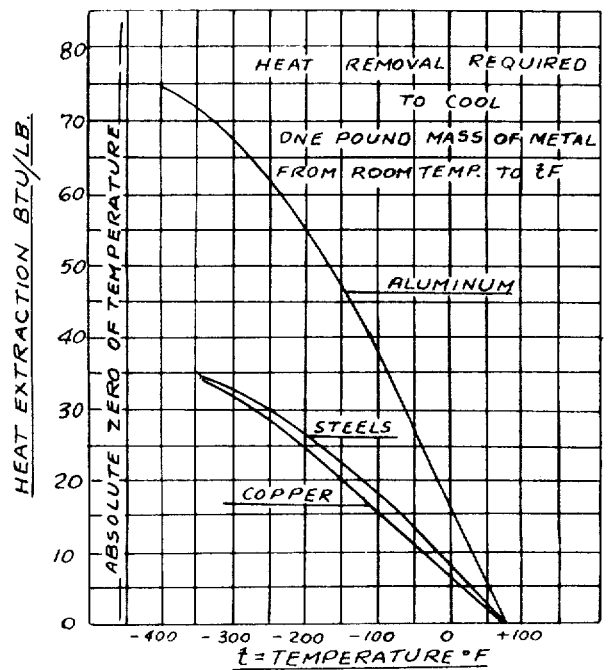
FIG. 6 is a curve showing comparative refrigeration required for cooling steels as compared to copper and aluminum.

This invention relates to a process for disintegration with ease and low power input and facilitation of subsequent handling and densification of low density objects, such as metals or other materials, which become very brittle when cooled to cryogenic temperatures in the range of −50° F and below. Ordinary steel, for example, at a temperature of −200° F and lower, has practically no impact resistance and is easily broken. Heretofore such materials have been cut into small pieces by rotary shredders or bar cutters, such as guillotine cutters. In the shredding system, the parts may be ripped apart by opposite rotating cylinders provided with tooth elements. Both the shredding and cutting disintegration processes permit after separation of the mixtures among the shredded particles by physical property differences such as differences in magnetic or density properties. Where the objective is to densify the object, such as a junk automobile, simple baling has been used or baling combined with the above cutting or shredding method.

The cutting, shredding and baling methods as applied to steel are all high energy input systems. The purpose of this invention is to provide for the cryogenic crushing of steel with much less energy.

The process of this invention applies not only to ordinary or mildly alloyed steels but to many other materials such as rubber, plastic and other material, which become frangible or brittle or have a very low state of ductility at a low temperature, which is commonly known as the nil ductility temperature, i.e., N.D.T. Many scrap articles are mixtures of materials having vastly differing ductility at some common low temperature which permits separation. As an example, at $-80°$ F rubber is very brittle and steel not as brittle. Thus, an automobile tire can be cryogenically crushed to give a rubber powder and a separated steel bead or rim or safety mesh steel insert. Copper, aluminum and stainless steel retain their ductility at temperatures of the order of $-200°$ F and lower, whereas steel does not. Thus, articles of, for example, copper and steel in a cryogenic crusher, would provide steel particles and copper uncrushed, which facilitates separation by various screening or magnetic processes.

For the purpose of example, there are shown in FIGS. 1 through 5 schematic diagrams of cryogenic processes used for cooling scrap steel. For the purpose of example, nitrogen will be considered as the cryogen, although it will be understood that refrigerated air can also be employed, just as instead of scrap steel other scrap materials, as previously described, which become embrittled at cold temperatures, can be utilized. FIGS. 1 and 2 disclose processes in which the cold is not recovered from the cryogenically frozen material that is broken, while FIGS. 3, 4 and 5 show different embodiments of the cold recovery process of this invention.

In FIG. 1, the cryogen as liquid nitrogen at $-320°$ F corresponding to $-195°$ C which is approximately the boiling point of nitrogen, is shown in a cryogen tank 10 covered with thermal insulation 11. Liquid nitrogen may be added as make-up in inlet 12. Scrap steel at 14 is charged to the cryogen bath, is cooled to $-200°$ F, removed from the bath, and then is broken by a breaker 16. The required refrigeration per pound of steel is approximately 0.302 pounds of liquid nitrogen as shown in the example below:

| | |
|---|---|
| Heat extraction from steel ($+80F$ to $-200F$) | $= 26$ Btu/lb. |
| Heat of vaporization of liquid nitrogen | $= 86$ Btu/lb. |
| Lbs. of liquid nitrogen/lb. of steel | $= 26/86 = 0.302$ |

The power required to make the liquid nitrogen from gaseous nitrogen at $80°$ F, 14.7 psia pressure at a practical thermodynamic efficiency of 30 percent to permit fragmenting 1 ton of steel per hour is 260 H.P. in this FIG. 1 process.

In FIG. 2 a more efficient utilization of the effective refrigeration from the liquid cryogen is employed, through the use of the cold, refrigerating effluent vaporized gas from the liquid bath. In FIG. 2 a gas effluent and scrap inlet tunnel 18 with insulation 19 is provided connected with the cryogen bath 10 and its insulation 11. A conveyor 20 is employed to charge the scrap steel into the tank through the tunnel. A curtain or door-like means 22 is used to seal the refrigerant upon the withdrawal of the scrap steel from the tank as it is charged to the breaker 16. In this process, the final temperature of $-200°$ F of the scrap steel at the breaker is utilized just as in the process of FIG. 1. The scrap steel 14 is cooled in the effluent tunnel 18 countercurrently with the vaporized effluent nitrogen, which rises from the cryogen tank 10 and is exhausted through the tunnel. In this process, there is a more efficient utilization of the refrigerant content in the liquid cryogen by using the refrigeration effect in the effluent gas and the pounds of liquid nitrogen required to cool a pound of steel is reduced to 0.142 as compared with the value of 0.302 in FIG. 1. The values in the example of this process are as set forth below:

| | |
|---|---|
| Heat extraction from steel | $= 26$ Btu/lb. |
| Heat into liquid and gaseous nitrogen | $= 184$ Btu/lb. |
| Lbs. of liquid nitrogen/lb. of steel | $= 26/184 = 0.142$ |

The practical horsepower required to produce the liquid cryogen to fragment 1 ton of steel per hour in the process of FIG. 2 $= 122$ H.P.

In FIG. 3, the process of this invention is shown where the refrigeration from the evaporated cryogen gas is recovered from the tank 10 in the inlet tunnel 18 and the refrigeration from the still cold, disintegrated material is recovered in cold recovery tunnel 28. The refrigeration recovery duct 28 provides for recovery of the refrigeration from the broken up or disintegrated scrap material. Additional liquid cryogen may be introduced into the system through an inlet for make-up of losses in the system.

In the process of FIG. 3, a gas recycle duct 30 is employed with a blower 32 to recycle refrigerant gas from the tunnel 18 back to the refrigeration recovery tunnel 28. A curtain or door-like means 34 is provided to permit discharge of the broken up scrap material while retaining the cold temperature in the cold recovery duct. In this system, the final temperature of the scrap material is $-200°$ F at the breaker 16 which breaks the material against an anvil 36. The cold, broken up scrap steel moves in continuous countercurrent heat exchange in the system for full recovery of the refrigeration from the broken up scrap material and provides for full precooling of the material, both from the refrigeration gas from the duct 28 and through vaporization losses from the cryogen tank in the precooling tunnel. The refrigeration values showing the improved refrigeration economy in this process are shown below where it is demonstrated that the pounds of liquid nitrogen required per pound of steel has been reduced to 0.022 pounds of liquid nitrogen:

| | |
|---|---|
| Net heat extraction from steel (heat change $= 0$ to 2 Btu/lb. from 80F to 60F) | $= 2$ Btu/lb. |
| Heat leak (assumed 2 × above) | $= 2$ Btu/lb. |
| total | $= 4$ Btu/lb. |
| Heat into liquid and gaseous nitrogen | $= 184$ Btu/lb. |
| Lbs. of liquid nitrogen/lb. of steel | $= 4/184 = 0.022$ |

The practical horsepower to produce the liquid cryogen for the process of FIG. 3 to fragment 1 ton of steel per hour is 19 H.P.

A modification of the cyclic process shown in FIG. 3 is illustrated in FIG. 4 where the very cold refrigeration cryogenic source is provided by the exhaust from a low temperature turbo-expander. This exhaust may be all gas or mixture of liquid and gas which, as above illustrated, may be nitrogen or air. The exhaust temperature is adjustable by change in the inlet pressure and temperature of the gas feed to the turbo-expander. In this process, a cryogenic zone is indicated by the reference numeral 40 provided by the exhaust from a turbo-expander 42 through an inlet conduit 44. The turbo-expander, in turn, is coupled through coupling 46 with a compressor 48 which receives a portion of the recycled refrigerant fluid through conduit 50 from the duct work 30. To provide for only fresh air intake conduit 50 may be disconnected from duct 30 and air is inspirated at intake 51. A cleaner 52 is provided to insure that the nitrogen or air, as the case may be, is cleaned before introduction into the compressor. A molecular sieve bed 57 is provided to remove traces of carbon dioxide and water vapor which tend to foul the turbo-expander. A make-up power source 54 is provided to power the compressor and it will be understood that at least a portion of this work may be provided through the work provided by the turbo-expander. An auxiliary refrigerator 56 is also provided to add additional refrigeration to the gas feed to the turbo-expander where desired to lower the exhaust temperature in conduit 44. A water cooler may be used as may conventional freon refrigerant where cooling to lower temperatures such as $-15°$ F is desired. The refrigerator is also used to aid in the removal of moisture from the high pressure air or nitrogen.

In the process of FIG. 4, a complete cyclic fluid process is provided which recycles the refrigerant gas from the cryogenic freezing zone 40 countercurrent with the incoming scrap steel through the pre-cooling tunnel 14 and then back through the duct work 30. In the duct work 30 a portion of the recycled and warmed refrigerant fluid may be passed through the compressor and turbo-expander to provide the very low temperature cryogenic refrigerant for introduction through conduit 44 to the cryogenic zone. The remainder of the recycled refrigerant gas is passed through the duct 30 back to the cold recovery duct 28, as in the cyclic process described in FIG. 3. The duct work 30 in FIG. 3 or FIG. 4 may be cut off directly after the blower 32 and the air directed into a cyclone separator for dust control. Fresh air would then enter at the curtain or door-like means 34 to pass countercurrently through the tunnels. Although the cryogen gas which, for the purpose of example, will be nitrogen is shown at −320° F other temperatures may be employed that are more economical and, as desired, depending upon the scrap material. Such variations in temperatures are especially realizable in the turbo-expander cycle of FIG. 4 which inherently can operate with nitrogen or air over a wide range of exhaust temperatures from −50° to +320° F.

In the process of FIG. 4, the system is shown for the purpose of example, where the final temperature of the scrap steel is −200° F at the breaker 16. Considering the same operation as in FIG. 3, the turbine can exhaust either cold nitrogen (or air) or a wet exhaust of mixed liquid nitrogen and gaseous nitrogen (or air). For this process, as a purpose of example, the refrigerant values are as shown below where, in the process, 0.0425 pounds of gas per pound of steel are utilized:

| | |
|---|---|
| Net heat extraction from steel (includes heat leak) | = 4 Btu/lb. |
| Heat into gas, air or nitrogen (−320°F. to 60°F.) | = 94 Btu/lb. |
| Lbs. of gas/lb. of steel | = 0.0425 |

The power required to produce the cryogen to fragment 1 ton of steel per hour = 17 H.P.

In FIG. 5 there is shown a modification of the cyclic turbo-expander process of FIG. 4 applied to junked automobiles. In this process, a junked automobile 60 may first be burned at burning station 62 to remove combustible material, where pollution control is exercised on the combustion products, for preliminarily removing such combustible material. It will be understood that such combustible material can be later separated from the disintegrated steel by other physical processes, such as magnetic separation, differences in specific gravity and other known processes. Also at this stage, where desired, the engine block transmission, and tires may be removed for preliminary recovery, although it is to be understood that these may also be left in the automobile and disintegrated in the process of this invention. The junk automobile is moved to the compacting station 64 where it is generally compacted or compressed by hydraulic presses to a more easily handled configuration. This also is an optional stage that can be utilized for greater efficiency and ease in handling, but it will be understood that this station may also be obviated. From the compacting station, the compacted car body is then moved on a conveyor to the inlet tunnel where the bodies are charged to the cryogenic freezing zone through a sealed chute 66. In this zone, the car bodies are cooled and are shredded by a rotary shredder 68 having toothed elements 70. The embrittled car body is shredded into fragments and the disintegrated material is passed through a grizzly screen 72 to a conveyor 74. In the shredding zone 68 recycling of the refrigerant fluid may be effected through duct 76 and a cyclonic cleaner 78 with blower 79 to return the fluid to the system and minimize the build up of dust and gas borne debris. The collected debris is discharged through bottom nozzle 77.

On the conveyor 74 the disintegrated and refrigerated material is passed through the cold recovery duct 28 over magnetic separators 80 and magnetic rolls 81. The non-ferrous disintegrated material is discharged through the curtain or door-like means 34 while the ferrous material, is retained on the conveyor through the effect of the magnets 80 and rolls 81 and, after it passes on the underneath side of the conveyor, is released and discharged through an outlet chute 82. This process provides for efficient utilization of refrigerant in a cyclic and continuous process for handling junked automobiles.

Figure 7A:
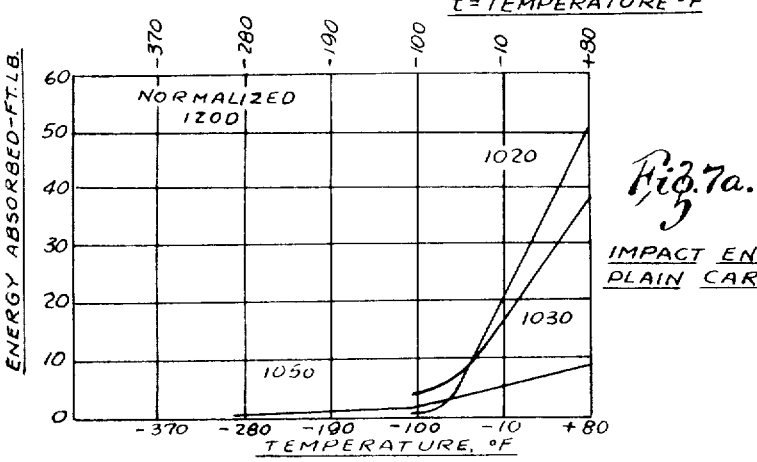
Figure 7B:
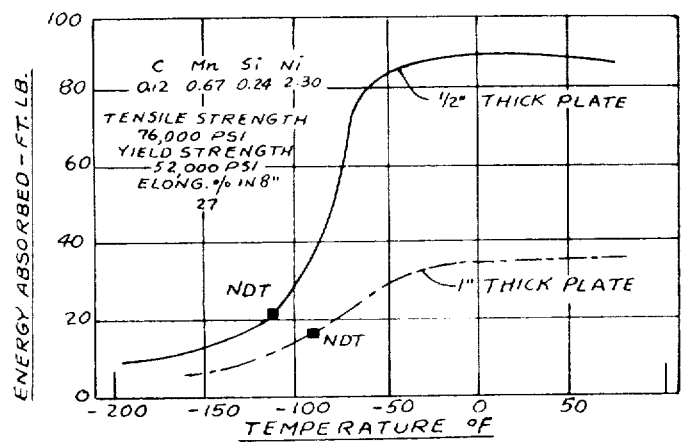
FIG. 7b is a similar curve for nickel steels showing the nil ductility temperature as N.D.T.

In the cryogenic freezing process, consideration must be given to the amount of refrigeration required to cool a metal from ambient or room temperature considered at 80° F to a lower temperature which requires the abstraction and removal of heat in the form of Btu's. The typical curves for such heat removal for the three common metals of steel, copper and aluminum commonly encountered in various scrap metals and junked automobiles are shown in FIG. 6. These curves give typical values for the heat extraction required to cool the metal to a desired temperature. In FIGS. 7a and 7b, there are shown the effect of low temperature on various types of carbon and nickel steels, with regard to their breaking strength. This breaking strength as shown in FIGS. 7a and 7b is in the form of energy absorbed in foot pounds in the well-known V-notch Izod and Charpy impact test on plain carbon and 2¼ percent nickel steel plate. Notched Izod and Charpy toughness is a property of steel reflected in its resistance to brittle failure under conditions of high stress concentration, such as impact and the like, and indicates low temperature strengths. The Izod or Charpy notched bar impact tests are widely used to test the toughness of steels intended for low temperature and cryogenic service. The notched toughness of alpha ferritic steels or materials with a body centered cubic crystal lattice structure generally decreases with decreasing temperature. Face centered cubic crystal lattice materials (copper, aluminum, gold, gamma phase or Austenitic iron) are tough at low temperatures. Since decreasing temperature is one of the major factors effecting toughness, the notched toughness is most conveniently measured by lowering the temperature of notched test specimens to a point where behavior changes from predominantly ductile to predominantly brittle or N.D.T., i.e., nil ductility temperature. This point of embrittlement at low temperatures varies for different steels, depending upon their composition and thickness, but generally this value is below 10 foot pounds.

It will be understood that other types of tests may be employed to determine the embrittlement or nil ductility temperature to indicate the tendency of the steel to behave in a tough or brittle manner. This test is an indication of the low temperature required for breaking up of scrap steel of various types, according to the process of this invention. Similar embrittlement tests may be used on other materials besides steels that become embrittled upon subjection to cryogenic temperatures in similar fashion, depending upon their known physical properties, to give an indication of the low temperature to which the material must be cooled, according to this process.

Various changes and modifications may be made in the process of this invention, as will readily appear to those skilled in the art. Such changes and modifications are within the scope and teaching of this invention as defined by the claims appended hereto.

What is claimed is:

1. A process for disintegrating solid materials whose impact resistance is reduced by cold temperatures which comprises pre-cooling said materials prior to passing them in contact with a cryogenic cooling fluid, disintegrating said materials after being cryogenically cooled and recovering refrigeration from the disintegrated material and using it in the aforesaid pre-cooling stage, the refrigeration being recovered from the disintegrated material by passing a fluid in heat exchange relation with the disintegrated material to cool said and subsequently passing said cooled fluid in heat exchange relation with the material in the pre-cooling stage to cool said material, said fluid consisting at least in part of the refrigeration fluid that is used in the cryogenic cooling stage, said fluid being passed in countercurrent head exchange relation in sequence past the disintegrated material, the cryogenic cooling stage and the material in the pre-cooling stage.

2. The process of claim 1 in which at least part of the refrigeration fluid after passing in heat exchange with said material in the pre-cooling stage is compressed, aftercooled, and then expanded to further cool said refrigerant fluid and using the so cooled refrigerant fluid in the cryogenic cooling stage.

3. The process of claim 1 in which the refrigeration fluid is supplied from an external source, is compressed aftercooled, and then expanded to cool said refrigerant fluid and the so cooled refrigerant fluid is used in the cryogenic cooling stage.

4. The process of claim 2 in which part of the fluid after passing in heat exchange with said material in the pre-cooling stage is recycled in the process by passing it in heat exchange relation with the disintegrated material to cool said fluid.

* * * * *